(12) United States Patent
Beardsley et al.

(10) Patent No.: US 9,245,331 B2
(45) Date of Patent: Jan. 26, 2016

(54) VIDEO CONTRAST ENHANCEMENT WITH SUB-SEGMENTS

(71) Applicant: RAYTHEON COMPANY, Waltham, MA (US)

(72) Inventors: Christopher J. Beardsley, McKinney, TX (US); Luan B. Do, McKinney, TX (US)

(73) Assignee: RAYTHEON COMPANY, Wahtlam, MA (US)

( * ) Notice: Subject to any disclaimer, the term of this patent is extended or adjusted under 35 U.S.C. 154(b) by 91 days.

(21) Appl. No.: 14/283,007

(22) Filed: May 20, 2014

(65) Prior Publication Data

US 2015/0339807 A1    Nov. 26, 2015

(51) Int. Cl.
*G06K 9/40* (2006.01)
*G06T 5/00* (2006.01)
*G06T 5/40* (2006.01)

(52) U.S. Cl.
CPC . *G06T 5/009* (2013.01); *G06K 9/40* (2013.01); *G06T 5/40* (2013.01); *G06T 2207/10048* (2013.01); *G06T 2207/20016* (2013.01); *G06T 2207/20204* (2013.01)

(58) Field of Classification Search
None
See application file for complete search history.

(56) References Cited

U.S. PATENT DOCUMENTS

| | | | | |
|---|---|---|---|---|
| 5,982,926 A | * | 11/1999 | Kuo et al. | 382/167 |
| 6,504,954 B1 | * | 1/2003 | Goldstein | 382/168 |
| 2008/0247665 A1 | * | 10/2008 | Hsu | 382/274 |
| 2010/0053061 A1 | * | 3/2010 | Leung et al. | 345/102 |

FOREIGN PATENT DOCUMENTS

WO    WO 98/59320 A1    12/1998

* cited by examiner

*Primary Examiner* — Li Liu
(74) *Attorney, Agent, or Firm* — Christie, Parker & Hale, LLP

(57) ABSTRACT

A system and method for image contrast enhancement using sub-segments. A coarse piecewise linear transform is formed based on the intensity distribution in an image, the segments of the piecewise linear transform selected to produce, when the piecewise linear transform is applied to the image, an improved intensity distribution, e.g., one approximating a Rayleigh distribution. A fine piecewise linear transform is formed by forming sub-segments at each of the breakpoints of the coarse piecewise linear transform.

18 Claims, 6 Drawing Sheets

VIDEO CONTRAST ENHANCEMENT WITH SUB-SEGMENTS

STATEMENT REGARDING FEDERALLY SPONSORED RESEARCH OR DEVELOPMENT

This invention was made with U.S. Government support under contract No. Withheld, awarded by the Department of Defense. The U.S. Government has certain rights in this invention.

BACKGROUND

1. Field

One or more aspects of embodiments according to the present invention relate to image processing and more particularly to contrast enhancement in video produced by infrared (IR) detectors.

2. Description of Related Art

Infrared imaging systems, and especially systems with high-definition (HD) mid-wavelength infrared (MWIR) detectors and slow optics, may have narrow dynamic ranges, resulting in images that if displayed directly to a human viewer will appear to contain only barely distinguishable shades of grey. Moreover, an image with a single hot spot target in the field of view (FOV) may result in a gain decrease to avoid saturation at the hot spot, which may in turn result in reduced contrast over the remainder of the image. Another example of a scene that may result in a poor quality image in a short wavelength infrared (SWIR) system is a scene containing lights and a black background. In this situation also, the overall gain may be reduced to avoid saturation at the lights, resulting in poor contrast in the surrounding areas.

Contrast enhancement stages, using, e.g., a piecewise linear transform (PLT), may be used to generate images that have a greater range of brightness values, or "intensity" values, and are more useful to the viewer. In a piecewise-linear-transform, however, if two adjacent segments have a large gain differential, small changes in the scene, or noise, may cause an input pixel to be mapped alternately to one or the other of the two adjacent segments, causing unacceptable flicker in the output image. This tendency to produce flicker may be reduced by implementing a segment-to-segment (STS) gain limit for all except the end segments, but this approach limits dynamic range at the output of the contrast enhancement stage, thereby limiting the contrast enhancement available.

Thus, there is a need for a system and method for contrast enhancement, which provides significant contrast enhancement without introducing unacceptable image flicker.

SUMMARY

In a system and method for image contrast enhancement using sub-segments, a coarse piecewise linear transform is formed based on the intensity distribution in an image. The segments of the piecewise linear transform are selected to produce an improved intensity distribution when the piecewise linear transform is applied to the image, e.g., an intensity distribution approximating a Rayleigh distribution. A fine piecewise linear transform is formed by forming sub-segments at each of the breakpoints of the coarse piecewise linear transform.

According to an embodiment of the present invention there is provided a method for processing an input image including intensity values, the method including: calculating an intensity value distribution for the input image; forming a first piecewise linear transform, the first piecewise linear transform configured to transform the intensity distribution of the input image, the first piecewise linear transform including a sequence of first segments, each segment of the sequence of first segments having a gain, the sequence of first segments being connected at a first plurality of breakpoints, the difference between the respective gains of any pair of segments, of the sequence of first segments, connected at a breakpoint of the first plurality of breakpoints being less than a first gain change limit, forming a second piecewise linear transform, the second piecewise linear transform including a sequence of second segments corresponding to a pair of first segments connected at one of the first plurality of breakpoints, each segment of the sequence of second segments having a gain, the sequence of second segments being connected at a second plurality of breakpoints, the difference between the respective gains of any pair of segments, of the sequence of second segments, connected at a breakpoint of the second plurality of breakpoints being less than a second gain change limit, the second gain change limit being less than the first gain change limit; and mapping the intensity values of the input image to modified intensity values using the second linear piecewise transform.

In one embodiment, the sequence of second segments includes a first segment and last segment; the gain of the first segment is substantially the same as the gain of a first one of the pair of first segments; and the gain of the last segment is substantially the same as the gain of a second one of the pair of first segments.

In one embodiment, the segments of the sequence of second segments have substantially equal length.

In one embodiment, for each of the segments of the sequence of second segments the difference between: an input value corresponding to a first end of the segment; and an input value corresponding to a second end of the segment, is substantially the same.

In one embodiment, the first gain change limit is greater than 3 and less than 7.

In one embodiment, the second gain change limit is greater than 1.3 and less than 1.8.

In one embodiment, the sequence of second segments consists of at least 3 segments and at most 8 segments.

In one embodiment, the forming of a first piecewise linear transform includes defining the segments of the sequence of first segments so that a distribution of the modified intensity values approximates a desired distribution.

In one embodiment, the desired distribution is a Rayleigh distribution.

According to an embodiment of the present invention there is provided a system for processing an input image including intensity values, the system including a processing unit configured to: calculate an intensity value distribution for the input image; form a first piecewise linear transform, the first piecewise linear transform configured to transform the intensity distribution of the input image, the first piecewise linear transform including a sequence of first segments, each segment of the sequence of first segments having a gain, the sequence of first segments being connected at a first plurality of breakpoints, the difference between the respective gains of any pair of segments, of the sequence of first segments, connected at a breakpoint of the first plurality of breakpoints being less than a first gain change limit, form a second piecewise linear transform, the second piecewise linear transform including a sequence of second segments corresponding to a pair of first segments connected at one of the first plurality of breakpoints, each segment of the sequence of second segments having a gain, the sequence of second segments being connected at a second plurality of breakpoints, the difference between the respective gains of any pair of segments, of the sequence of second segments, connected at a breakpoint of the second plurality of breakpoints being less than a second gain change limit, the second gain change limit being less than the first gain change limit; and mapping the intensity values of the input image to modified intensity values using the second linear piecewise transform.

In one embodiment, the sequence of second segments includes a first segment and last segment; the gain of the first segment is substantially the same as the gain of a first one of the pair of first segments; and the gain of the last segment is substantially the same as the gain of a second one of the pair of first segments.

In one embodiment, the segments of the sequence of second segments have substantially equal length.

In one embodiment, for each of the segments of the sequence of second segments the difference between: an input value corresponding to a first end of the segment; and an input value corresponding to a second end of the segment, is substantially the same.

In one embodiment, the first gain change limit is greater than 3 and less than 7.

In one embodiment, the second gain change limit is greater than 1.3 and less than 1.8.

In one embodiment, the sequence of second segments consists of at least 3 segments and at most 8 segments.

In one embodiment, the forming of a first piecewise linear transform includes defining the segments of the sequence of first segments so that a distribution of the modified intensity values approximates a desired distribution.

In one embodiment, the desired distribution is a Rayleigh distribution.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a video contrast enhancement with sub-segments provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1A:
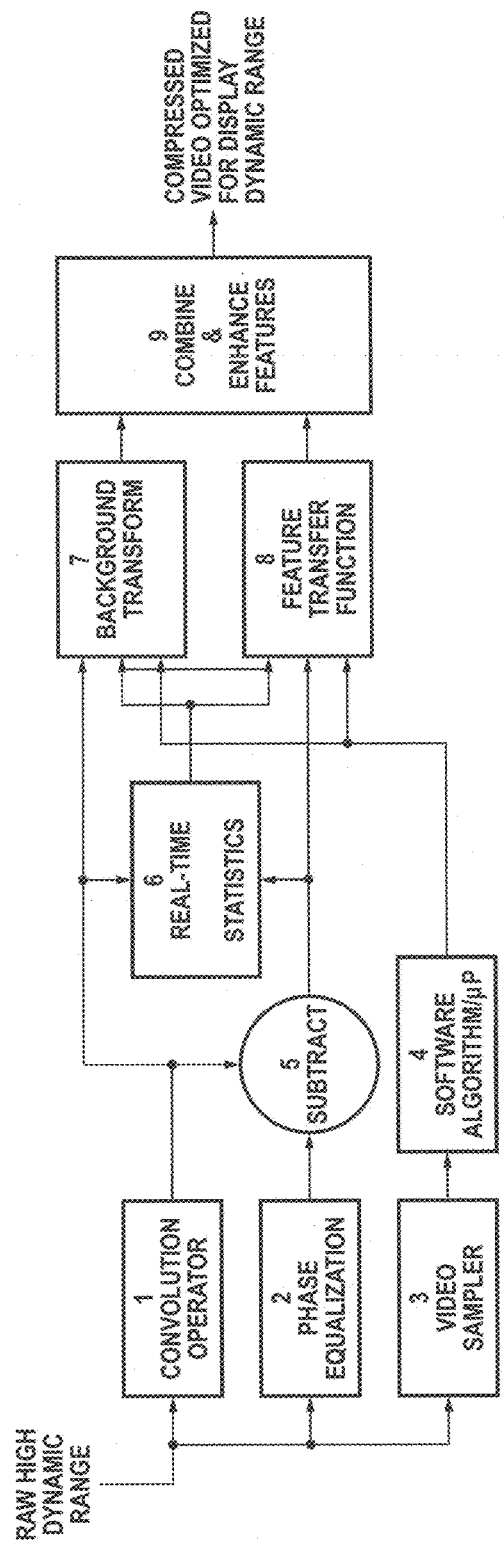
FIG. 1A is a block diagram of a system for image processing according to an embodiment of the present invention.
Figure 1B:
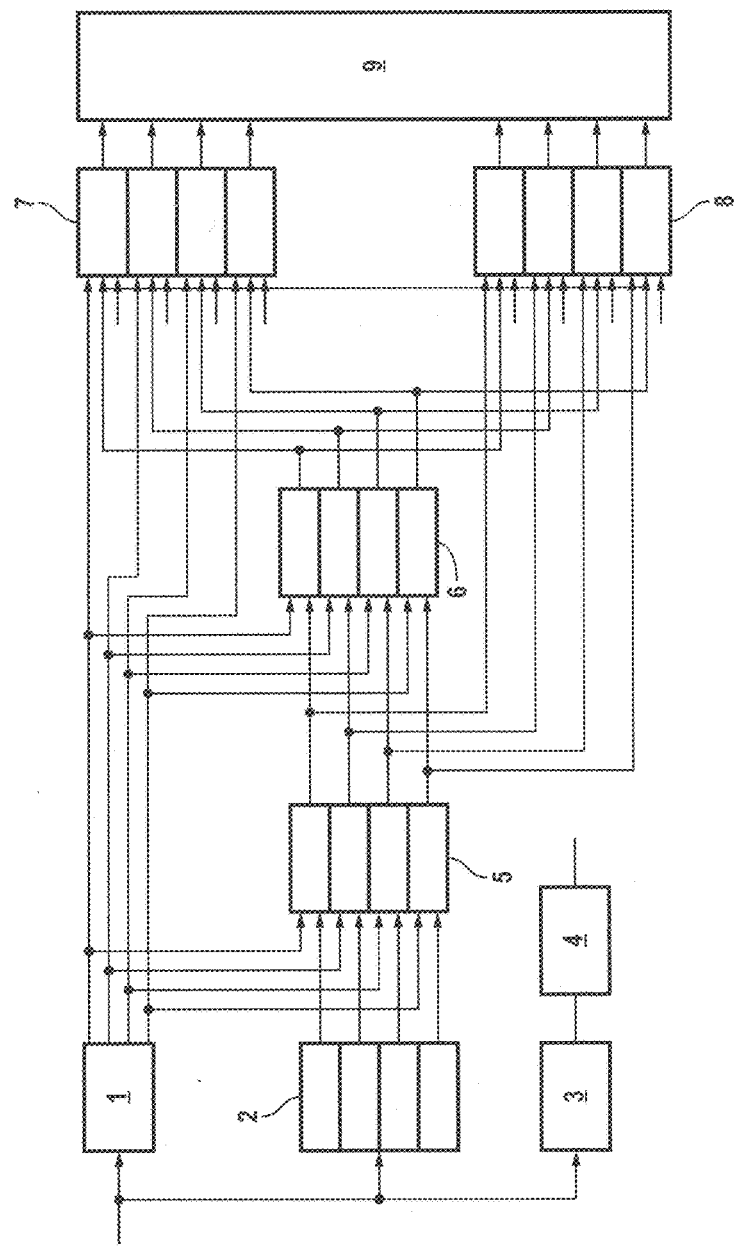
FIG. 1B is an expanded block diagram of a system for image processing according to an embodiment of the present invention.

FIGS. 1A and 1B show a block diagram of an image processor according to an embodiment of the present invention. The image processor receives raw image data from a sensor, e.g., a video sensor, at its input, which is assumed, for the present example, to have a data rate of 64 MHZ, this data being fed to each of a convolution operator 1 having N outputs, where N may be equal to 4 in the case in which the circuitry is capable of operation up to 16 MHZ (i.e., data applied to the convolution operator 1 at a 64 MHZ rate is interlaced among the four outputs therefrom to provide four spatially related and differently phased outputs, each at a 16 MHZ rate). A phase equalization circuit 2 compensates for the delay incurred in the convolution operator 1, there being four identical such phase equalization circuits and at least one video sampler circuit 3. The phase equalization circuits 2 insure that the data arriving at the subtract circuits 5 from each of the convolution operator 1 and the initial input are co-temporal. Each output of the convolution operator 1 and each phase equalization circuit 2 is uniquely coupled to one of four subtract circuits 5 which subtracts the background information from the phase equalized raw data of the entire scene, each subtract circuit providing a signal to one of four real-time statistics circuits 6 along with one of the outputs from the convolution operator 1. The real-time statistics circuit 6 makes a statistical sampling of the scene and uses a fraction of that information to provide a histogram of the scene and how the transfer functions are to be compressed in accordance with a software program. The video sampler 3 provides a statistical sampling of the scene or raw data as discussed above, sampling, e.g., one twelfth of the data, and provides an output signal to software algorithm/μP 4. Software algorithm/μP 4 is a microprocessor executing a program that determines how the data is to be compressed. A background transform circuit 7, there being four such circuits, receives the data from the one output of the convolution operator 1, one of the real-time local area statistics circuits 6 and the software algorithm/μP 4 to redistribute the gray levels and provide an output to combiner circuit 9, which combines the outputs of the background transform circuit 7 and of the feature transfer function circuit 8. Each feature transfer circuit 8, of which there are four, receives data from one of the subtract circuits 5, software algorithm/μP 4, and one of the real-time local area statistics circuits 6 to also redistribute the gray levels and provide an output to combiner circuit 9. The combiner circuit 9 combines the data spatially to provide compressed video optimized for the display dynamic range.

Figure 2:
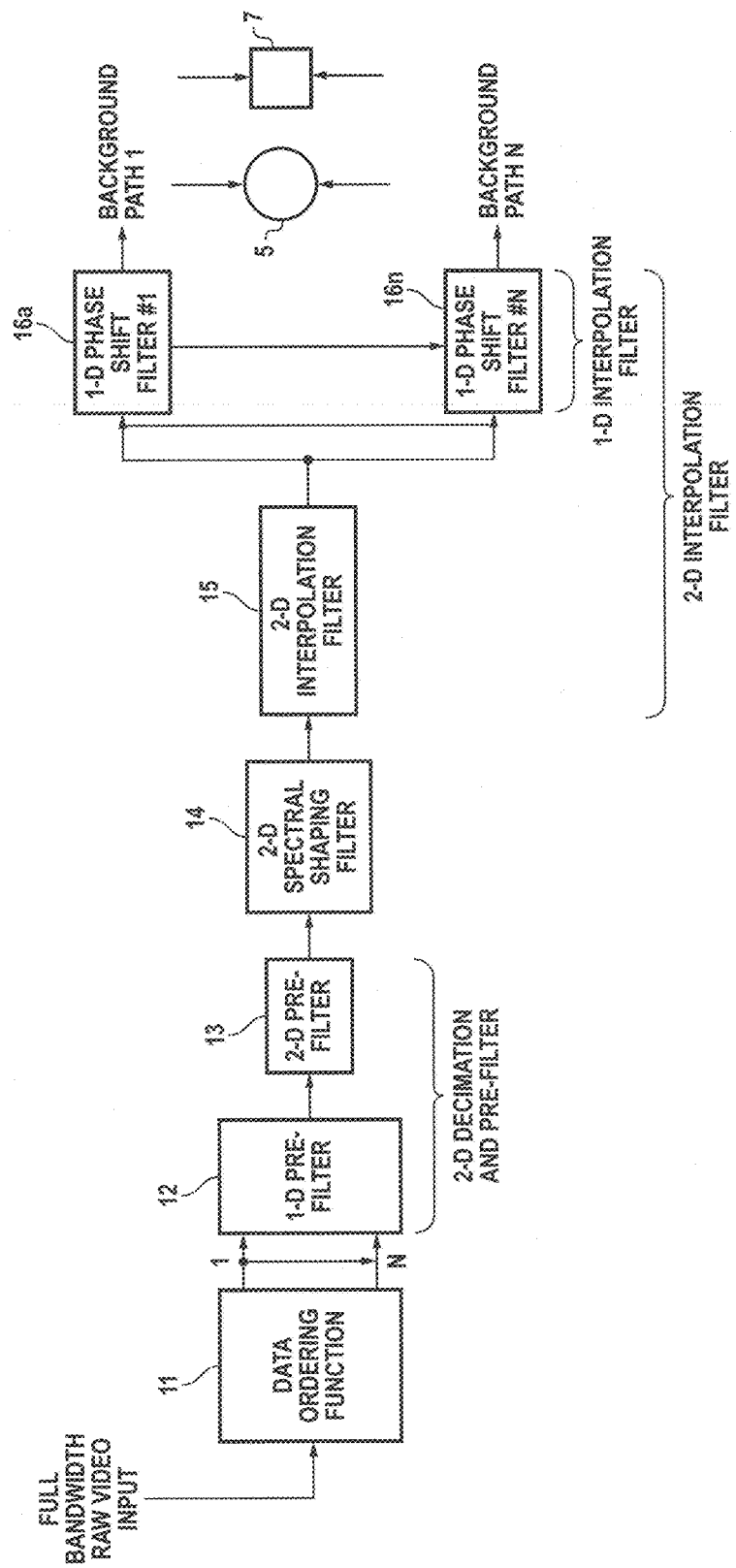
FIG. 2 is a block diagram of a convolution operator according to an embodiment of the present invention.

FIG. 2 shows a block diagram of the convolution operator 1, according to one embodiment. The convolution operator 1 low-pass filters the incoming data to provide a blurred image or background data. This is accomplished by breaking up the incoming data into a number of ordered paths (shown as 1 . . . N) in order to be able to handle the high data rate in data ordering function block 11. In one embodiment the number of such data paths or N is equal to four. The number of paths is determined by the data rate and the data rate capability of each path whereby the data rate in each path is reduced to the capability of that path. In addition, the paths are not independent since the spatial relationship of the data at the input must be maintained even though successive portions of data are located in different paths. The data in each path is then subjected to a two dimensional decimation and pre-filter that includes a one dimensional pre-filter 12 in series with a two dimensional pre-filter 13. The multiple inputs to filter 12 are essentially multiplexed to arrive at filter 13 along a single path, but at a higher data rate than the input to filter 12. The output of filter 12 is subjected to a two dimensional spectral shaping in filter 14 and is then sent to a two dimensional interpolation filter which comprises 2-D interpolation filter 15 and 1-D phase shift filters 16a to 16n. The 2-D interpolation filter 15 interpolates and returns the signal to the N output paths (four in this case). The signals in each output path are subjected to a one dimensional phase shift filter 16a to 16n. The outputs of the filter 16a to 16n provide the background information. The N background paths from the phase shift filter 16a to 16n are each connected to one of the subtract circuits 5, and to a transform circuit 7.

In one embodiment the background transform circuit 7 maps an input image to an output image using a piecewise linear transform. As used herein, a piecewise linear transform is a mapping from an input value to an output value, the mapping being piecewise linear, i.e., composed of straight line segments. Each line segment represents a mapping from input to output given by the equation $y=m_i x+b_i$, where x is the input value, e.g., the intensity value of a pixel in an input image and y is the output value, e.g., the intensity value of a pixel in an output image, and $m_i$ and $b_i$ are the slope, or "gain" of the $i^{th}$ line segment, and the offset of the $i^{th}$ line segment, respectively. The line segments meet at a sequence of points referred to as breakpoints. At each breakpoint, the slope, i.e., the differential gain, of the piecewise linear transform changes, from that of the linear segment on one side of the breakpoint to that of the linear segment on the other side.

Figure 3:
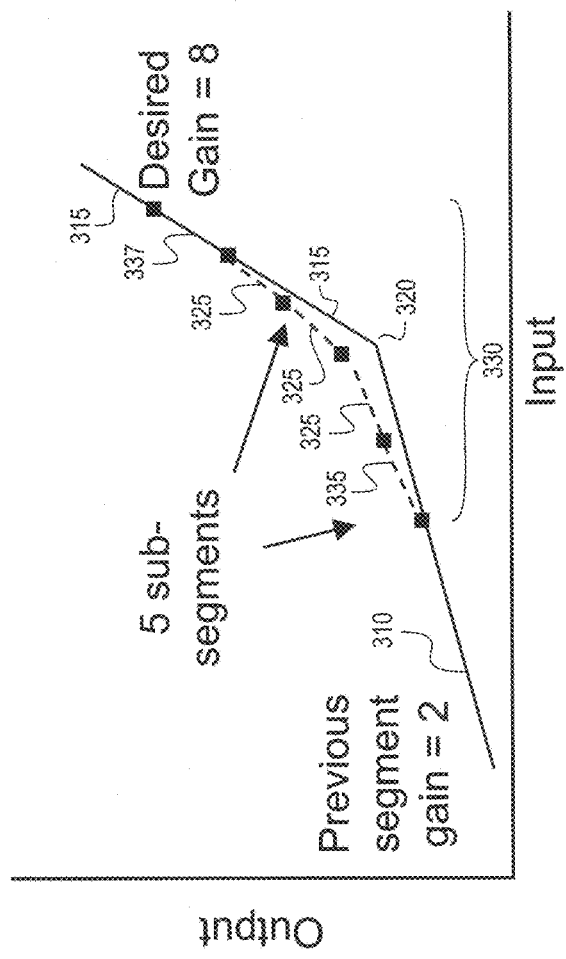
FIG. 3 is a graph of input and output for a piecewise linear transform with sub-segments according to an embodiment of the present invention.

Referring to FIG. 3; in one embodiment a piecewise linear transform may be constructed in two stages, with a first stage resulting in a coarse piecewise linear transform composed of a number of segments (also referred to as coarse line segments), and a second stage resulting in a fine piecewise linear transform with a larger number of more finely spaced sub-segments (also referred to as fine line segments). The gain difference between the segments may be relatively large, e.g., a factor of 4 as illustrated in the example of FIG. 3. If five sub-segments are used, with one of the sub-segments being collinear with one of the segments, then the gain change between any pair of adjacent sub-segments can be limited to the fifth root of the gain change between the pair of segments, i.e., the fifth root of 4 in the example illustrated in FIG. 3.

In one embodiment, a histogram of the intensity distribution in an image is used to generate the coarse piecewise linear transform. The image used may be a raw image from the sensor or an input image received by the background transform circuit 7. The coarse piecewise linear transform is then tailored, i.e., the breakpoints and the offsets and slopes, or "gains" of the line segments are selected, so that the histogram of the intensity distribution resulting from application of the coarse piecewise linear transform approximates a desired intensity distribution, such as a Rayleigh distribution. The approximation may be constrained by the requirement that the gain difference between any pair of adjacent line segments not exceed a first gain change limit. FIG. 3 illustrates two line segments 310, 315, forming a part of an exemplary coarse piecewise linear transform, with a gain change of 4 (the ratio of the gain, i.e., 2, of the line segment 310 and the gain, i.e., 8, of the line segment 315) at the breakpoint 320 between the line segments.

The fine piecewise linear transform is formed, in one embodiment, by defining a number, n, of fine line segments 325, 335, 337 to span an interval 330 at each breakpoint in the coarse piecewise linear transform. The interval spanned extends from the midpoint of the segment 310 on one side of the breakpoint 320 to the midpoint of the segment 315 on the other side of the breakpoint 320. The last fine line segment 337 is colinear with the second of the two coarse segments, i.e., with segment 315. The gain change between each pair of adjacent fine line segments, i.e., sub-segments, is equal to the $n^{th}$ root of the gain change between the pair of coarse line segments 310, 315, so that the gain change between the first fine line segment 335 and the first coarse line segment 310 is also equal to the $n^{th}$ root of the gain change between the pair of coarse line segments 310, 315. The maximum acceptable gain change between sub-segments may be referred to as a second gain change limit. For example, if a gain change of a factor of 1.5 is the largest gain change value between sub-segments that avoids unacceptable levels of image flicker, then the second gain change limit may be set to 1.5, and the first gain change limit may be the $5^{th}$ power of 1.5, i.e., approximately 5. In other embodiments, instead of the last fine line segment 337 being colinear with the second of the two coarse segments, the first fine line segment, or both the last fine line segment and the first fine line segment, or neither of these fine line segments may be colinear with the corresponding coarse line segment 310, 315, and the gain change between each pair of adjacent fine line segments may be adjusted accordingly.

Figure 4:
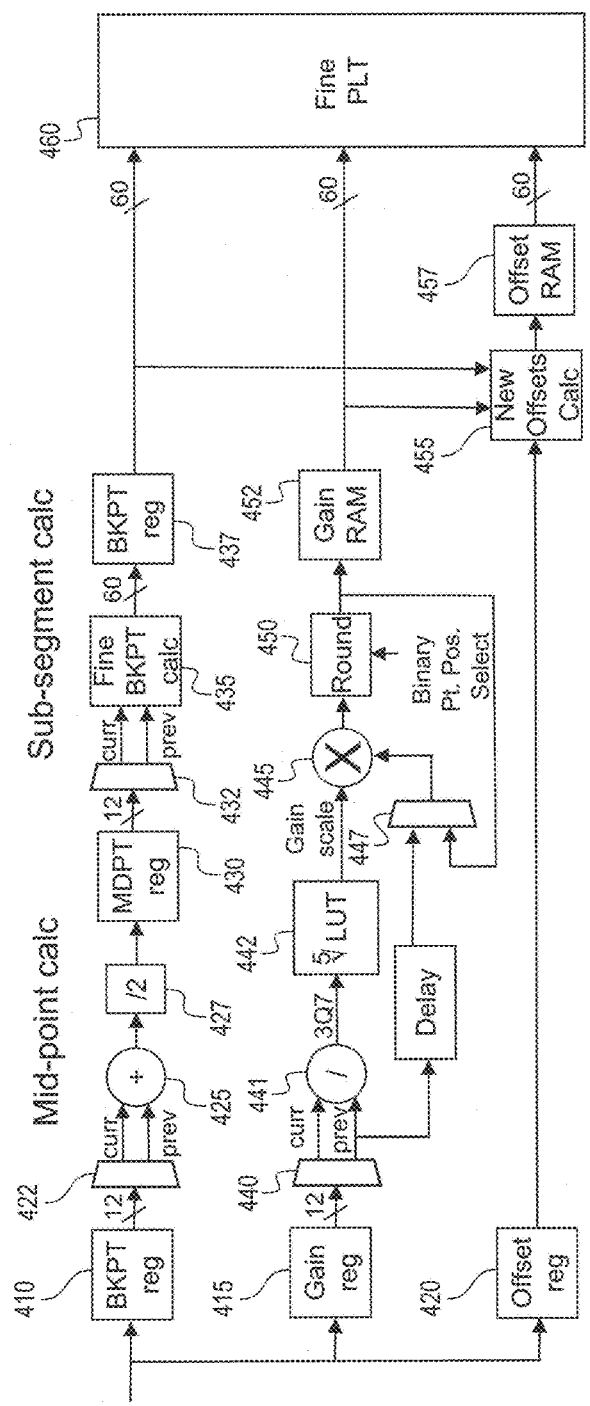
FIG. 4 is a block diagram of a system for generating sub-segments to form a fine piecewise linear transform according to an embodiment of the present invention.

In one embodiment, the coarse piecewise linear transform is formed by a first processing unit under the control of suitable software, resulting in a set of coarse breakpoints, coarse gains, and coarse offsets. Referring to FIG. 4, in one embodiment the forming of the fine piecewise linear transform is accomplished in digital hardware, such as a field-programmable gate array (FPGA) or an application specific integrated circuit (ASIC). The set of coarse breakpoints, the set of coarse gains, and the set of coarse offsets are written to corresponding coarse breakpoint registers 410, coarse gain registers 415, and coarse offset registers 420. A breakpoint multiplexer 422 iterates through the coarse breakpoints, at each point providing one coarse breakpoint and the previous one, i.e., the one preceding it in the coarse breakpoint register, to a breakpoint adder 425. The breakpoint adder 425 calculates the sum of the current coarse breakpoint and the previous one, and the sum is divided by two, in a divider 427, to obtain the average of the current and previous course breakpoints, i.e., the midpoint of the coarse line segment between the current and previous course breakpoints; this midpoint is stored in the midpoint register 430. A midpoint multiplexer 432 feeds pairs of adjacent midpoints into the fine breakpoint calculation block 435, which generates a set of fine breakpoints that are stored in the fine breakpoint register 437. The breakpoint calculation block 435 produces a set of equally-spaced breakpoints between the two midpoints.

In a parallel path in the processing unit, a gain multiplexer 440 feeds coarse gain values from the coarse gain registers 415 two at a time into a divider 441, which takes the ratio, for each pair, of a current gain and a previous gain, i.e., the divider 441 calculates the gain change at the coarse breakpoint between a coarse line segment and an adjacent coarse line segment. In one embodiment the divider output is represented as a fixed point 3Q7 number. The $5^{th}$ root is obtained from a lookup table (LUT) 442 and multiplied, in a multiplier 445, by either the gain of the previous coarse line segment or the gain of the previous fine line segment. The gain of the previous coarse line segment is used as a multiplicand in calculating the gain of the first fine line segment at a coarse breakpoint, and the gain of the previous fine line segment is used as a multiplicand in calculating the gain of the remaining fine line segments at the coarse breakpoint; a multiplexer 447 is used to select the appropriate multiplicand. In a rounding block 450, the digital representation of the product is adjusted, and the calculated gain is both fed back to the multiplexer 447 and stored in fine gain random-access memory (RAM) 452. In a third parallel path, the contents of the coarse offset registers 420 are combined with the fine breakpoints and the fine gains in a new offsets calculation block 455. In this block, a breakpoint near the center of the coarse piecewise linear transform is used as a starting point, and offsets for fine line segments are calculated in one direction, e.g., in the direction of higher image intensity, until the maximum intensity (corresponding to white) is reached. At each step the equation for a line, y=mx+b is evaluated to calculate an offset for a fine line segment. The calculation then starts again at the center of the coarse piecewise linear transform and proceeds in the same manner in the opposite direction, e.g., in the direction of lower image intensity, until the minimum intensity (corresponding to black) is reached. The offsets calculated in this manner are stored in offset RAM 457.

The fine PLT, using the fine breakpoints, fine gains, and fine offsets to define sub-segments is then used to process the input image, in a fine PLT block 460, to form an output image. In one embodiment, the coarse PLT includes 12 segments, and the fine PLT includes 60 sub-segments.

Figure 5:
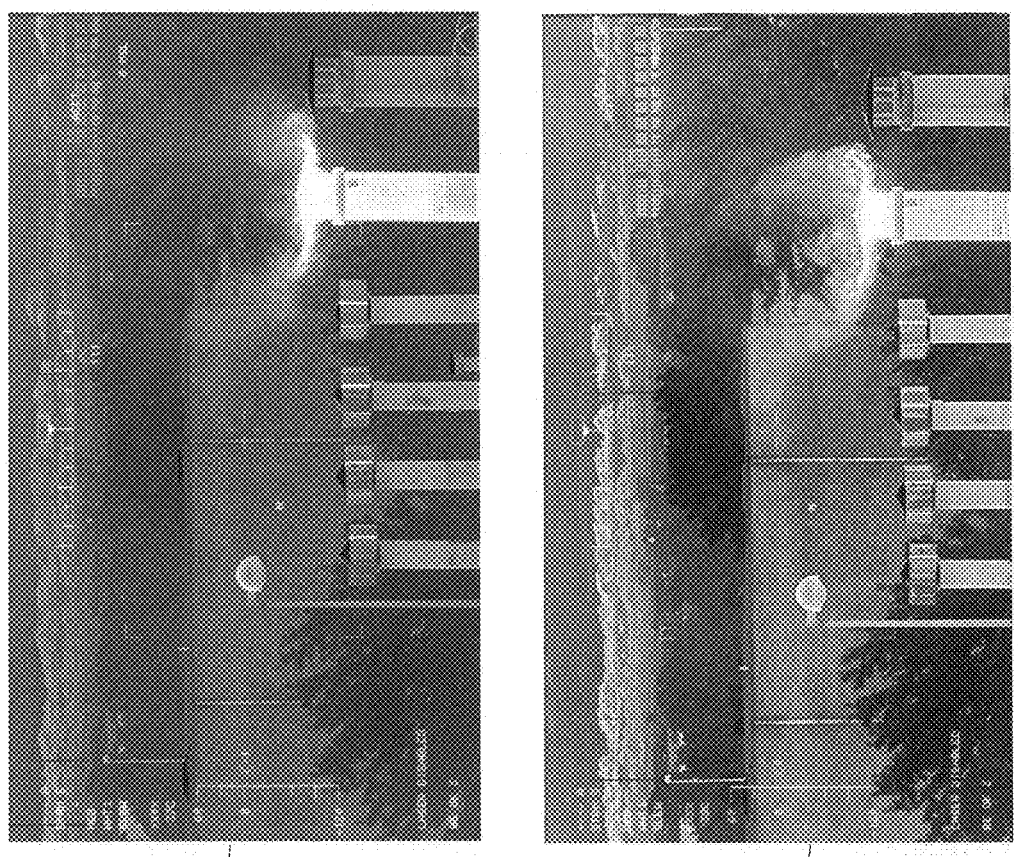
FIG. 5 is an image processed with a coarse piecewise linear transform and with a fine piecewise linear transform according to an embodiment of the present invention.

Referring to FIG. 5, in one embodiment of the present invention an image 510 formed using a piecewise linear transform with 12 sub-segments shows a bright region at lower right and the remainder of the image 510 is composed of poorly distinguishable shades of gray. After processing with sub-segments is applied to form a new image 520, the region in the lower right of the image 520 remains bright, but the range of gray values in the remainder of the image 520 is significantly greater, making it easier to distinguish features in that part of the image 520.

Elements of embodiments of the present invention may be implemented using one or more processing units. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). The term "processing unit" is used herein to include any combination of hardware, firmware, and software, employed to process data or digital signals. In a processing unit, as used herein, each function is performed either by hardware configured, i.e., hard-wired, to perform that function, or by more general purpose hardware, such as a CPU, configured to execute instructions stored in a non-transitory storage medium.

Although limited embodiments of a system and method for video contrast enhancement with sub-segments have been specifically described and illustrated herein, many modifications and variations will be apparent to those skilled in the art. Accordingly, it is to be understood that the system and method for video contrast enhancement with sub-segments employed according to principles of this invention may be embodied other than as specifically described herein. The invention is also defined in the following claims, and equivalents thereof.

What is claimed is:

1. A method for processing an input image comprising intensity values, the method comprising:
   calculating an intensity value distribution for the input image;
   forming a first piecewise linear transform,
      the first piecewise linear transform configured to transform the intensity distribution of the input image,
      the first piecewise linear transform comprising a sequence of first segments,
      each segment of the sequence of first segments having a gain,
      the sequence of first segments being connected at a first plurality of breakpoints,
      the difference between the respective gains of any pair of segments, of the sequence of first segments, connected at a breakpoint of the first plurality of breakpoints being less than a first gain change limit,
   forming a second piecewise linear transform,
      the second piecewise linear transform comprising a sequence of second segments corresponding to a pair of first segments connected at one of the first plurality of breakpoints,
      each segment of the sequence of second segments having a gain,
      the sequence of second segments being connected at a second plurality of breakpoints,
      the difference between the respective gains of any pair of segments, of the sequence of second segments, connected at a breakpoint of the second plurality of breakpoints being less than a second gain change limit,
      the second gain change limit being less than the first gain change limit; and
   mapping the intensity values of the input image to modified intensity values using the second linear piecewise transform.

2. The method of claim 1, wherein:
   the sequence of second segments comprises a first segment and last segment;
   the gain of the first segment is substantially the same as the gain of a first one of the pair of first segments; and
   the gain of the last segment is substantially the same as the gain of a second one of the pair of first segments.

3. The method of claim 1, wherein the segments of the sequence of second segments have substantially equal length.

4. The method of claim 1, wherein for each of the segments of the sequence of second segments the difference between:
   an input value corresponding to a first end of the segment; and
   an input value corresponding to a second end of the segment, is substantially the same.

5. The method of claim 1, wherein the first gain change limit is greater than 3 and less than 7.

6. The method of claim 1, wherein the second gain change limit is greater than 1.3 and less than 1.8.

7. The method of claim 1 wherein the sequence of second segments consists of at least 3 segments and at most 8 segments.

8. The method of claim 1, wherein the forming of a first piecewise linear transform comprises defining the segments of the sequence of first segments so that a distribution of the modified intensity values approximates a desired distribution.

9. The method of claim 8, wherein the desired distribution is a Rayleigh distribution.

10. A system for processing an input image comprising intensity values, the system comprising a processing unit and a memory, the processing unit being configured to:
   calculate an intensity value distribution for the input image;
   form a first piecewise linear transform,
      the first piecewise linear transform configured to transform the intensity distribution of the input image,
      the first piecewise linear transform comprising a sequence of first segments, each segment of the sequence of first segments having a gain, the sequence of first segments being connected at a first plurality of breakpoints, the difference between the respective gains of any pair of segments, of the sequence of first segments, connected at a breakpoint of the first plurality of breakpoints being less than a first gain change limit, form a second piecewise linear transform, the second piecewise linear transform comprising a sequence of second segments corresponding to a pair of first segments connected at one of the first plurality of breakpoints, each segment of the sequence of second segments having a gain, the sequence of second segments being connected at a second plurality of breakpoints, the difference between the respective gains of any pair of segments, of the sequence of second segments, connected at a breakpoint of the second plurality of breakpoints being less than a second gain change limit, the second gain change limit being less than the first gain change limit; and map the intensity values of the input image to modified intensity values using the second linear piecewise transform.

11. The system of claim 10, wherein:

the sequence of second segments comprises a first segment and last segment;

the gain of the first segment is substantially the same as the gain of a first one of the pair of first segments; and the gain of the last segment is substantially the same as the gain of a second one of the pair of first segments.

12. The system of claim 10, wherein the segments of the sequence of second segments have substantially equal length.

13. The system of claim 10, wherein for each of the segments of the sequence of second segments the difference between:

an input value corresponding to a first end of the segment; and an input value corresponding to a second end of the segment, is substantially the same.

14. The system of claim 10, wherein the first gain change limit is greater than 3 and less than 7.

15. The system of claim 10, wherein the second gain change limit is greater than 1.3 and less than 1.8.

16. The system of claim 10 wherein the sequence of second segments consists of at least 3 segments and at most 8 segments.

17. The system of claim 10, wherein the forming of a first piecewise linear transform comprises defining the segments of the sequence of first segments so that a distribution of the modified intensity values approximates a desired distribution.

18. The system of claim 17, wherein the desired distribution is a Rayleigh distribution.

* * * * *